US006788516B1

(12) United States Patent
Kraetzschmar et al.

(10) Patent No.: US 6,788,516 B1
(45) Date of Patent: Sep. 7, 2004

(54) SELF-RECOVERING CURRENT-LIMITING DEVICE WITH LIQUID METAL

(75) Inventors: Andreas Kraetzschmar, Bonn (DE); Frank Berger, Swisttal-Miel (DE); Michael Anheuser, St. Augustin (DE); Wolfgang Kremers, Bonn (DE)

(73) Assignee: Moeller GmbH, Bonn (DE)

( * ) Notice: Subject to any disclaimer, the term of this patent is extended or adjusted under 35 U.S.C. 154(b) by 0 days.

(21) Appl. No.: 09/831,968

(22) PCT Filed: Nov. 16, 1999

(86) PCT No.: PCT/EP99/08799

§ 371 (c)(1),
(2), (4) Date: May 16, 2001

(87) PCT Pub. No.: WO00/31768

PCT Pub. Date: Jun. 2, 2000

(30) Foreign Application Priority Data

Nov. 20, 1998 (DE) ........................................ 198 53 577

(51) Int. Cl.[7] ................................................ H02H 3/22
(52) U.S. Cl. ...................................................... 361/111
(58) Field of Search ...................... 361/111; 338/80–85; 337/119, 121, 306, 21, 321, 114, 118, 120, 122

(56) References Cited

U.S. PATENT DOCUMENTS 4,429,295 A 1/1984 Wu ............................ 337/119

FOREIGN PATENT DOCUMENTS

| | | | | |
|---|---|---|---|---|
| DE | 1024595 | | 2/1958 | |
| DE | 1788143 | | 12/1972 | |
| DE | 1146966 | | 5/1978 | |
| DE | 2652506 | | 5/1978 | |
| DE | 4012385 | | 3/1991 | |
| GB | 424360 | | 2/1935 | |
| NL | 7508758 | | 1/1977 | |
| SU | 922911 | | 4/1982 | |
| SU | 1076981 | * | 2/1984 | .......... H01H/87/00 |
| SU | 1094088 | * | 5/1984 | .......... H01H/87/00 |

* cited by examiner

*Primary Examiner*—Brian Sircus
*Assistant Examiner*—James A Demakis

(57) ABSTRACT

The invention relates to a self-recovering current-limiting device with liquid metal. The device contains two solid metal electrodes (11, 12) which are rotationally symmetrical in relation to the longitudinal axis (3) of the current limiting device (1) and several compression chambers (4) which are partially filled with liquid metal (8) and arranged in a series between the electrodes (11, 12). The compression chambers are formed by pressure-resistant insulating bodies (5, 7) and insulating intermediate walls (6) which are supported by the same (6) and which have several connecting channels (9), distributed in a circular form. The aim of the invention is to extend the positions of use. To this end, the electrodes (11, 12) have cavities (14) which are connected to the adjacent compression chambers (4) by openings (16) and which are adequately wetted to completely filled with the liquid metal (8), according to the position of use.

6 Claims, 3 Drawing Sheets

SELF-RECOVERING CURRENT-LIMITING DEVICE WITH LIQUID METAL

FIELD OF THE INVENTION

The present invention relates to a self-recovering current-limiting device with liquid metal and including two electrodes made of solid metal.

RELATED TECHNOLOGY

Current-limiting devices with liquid metal are used for current limiting in low-voltage networks. Soviet Union Patent Document SU 922 911 A describes a self-recovering current-limiting device containing two electrodes which are made of solid metal and flatly configured toward the interior of the current-limiting device, the electrodes being separated by first insulating bodies which are designed as a cylindrical, pressure-resistant insulating housing. Inside the insulating housing, compression spaces are formed by insulating intermediate walls and second insulating bodies which are arranged therebetween and designed as ring-shaped sealing disks, the compression spaces being partially filled with liquid metal and arranged one behind the other and interconnected via connecting channels of the intermediate walls, the connecting channels being filled with liquid metal and arranged off-center. Thus, in normal operation, a continuous, inner conductive connection exists between the electrodes via the liquid metal. In the current-limiting event, the liquid metal is abruptly displaced from the connecting channels as a result of the high current density. In this manner, the electrical connection of the electrodes via the liquid metal is interrupted, resulting in the limiting of the short-circuit current. Subsequent to clearing or eliminating the short-circuit, the connecting channels refill with liquid metal whereupon the current-limiting device is operational again. In German Patent Application DE 40 12 385 A1, vacuum, protective gas, or an insulating liquid are mentioned as the medium above the liquid level. According to Soviet Union Patent Document SU 1 076 981 A, the connecting channels of adjacent intermediate walls are staggered relative to each other for improving the limiting characteristics. It is known from German Patent Application DE 26 52 506 A1 to use gallium alloys, in particular gallium-indium-tin alloys (GaInSn alloys), in contact devices. It is a disadvantage that the known current-limiting devices function only in horizontal positions of use and in those slightly deviating therefrom. A known current-limiting device according to Soviet Union Patent Document SU 1 094 088 A is equipped with intermediate walls in which several connecting channels are formed in a circle around the center axis and with separating walls made of copper which are arranged between the intermediate walls and led outward for cooling the liquid metal. This current-limiting device permits positions of use involving rotations of up to 360° about the horizontal center axis and inclinations of up to 50° relative to the horizontal, which, however, is rendered possible only in conjunction with the separating walls, which disadvantageously carry a potential, the compression spaces having to be individually filled with liquid metal in a manner requiring too much effort because of these separating walls.

SUMMARY OF THE INVENTION

Therefore, an object of the present invention is to provide a current-limiting device with liquid metal, the current-limiting device having an extended range of positions of use and being practical to manufacture and user-friendly.

The present invention provides aA self-recovering current-limiting device including a liquid metal, the device comprising:

- a first and a second electrode for connection to an electric circuit to be protected, each of the first and second electrodes being made of solid metal, being rotationally symmetrical with respect to a longitudinal axis, and defining respective hollow spaces therein;
- a plurality of pressure-resistant insulating bodies; and
- a plurality of insulating intermediate walls interleaved with and supported by the plurality of pressure-resistant insulating bodies and defining a plurality of connecting channels disposed in a circular pattern, the plurality of pressure-resistant insulating bodies and the insulating intermediate walls together defining a plurality of compression spaces disposed between the first and second electrodes, the plurality of compression spaces being interconnected by the plurality of connecting channels and being at least partially filled with the liquid metal;
- wherein the respective hollow spaces are each connected to an adjacent respective one of the plurality of compression spaces and wherein a respective volume of each of the hollow spaces and an amount of the liquid metal in the current-limiting device are selected so that an upper one of the first and second electrodes is sufficiently wetted with the liquid metal when the current-limiting device is in a position deviating substantially from a position when the longitudinal axis is horizontal.

The hollow spaces of the electrodes provide additional space serving as a reservoir for liquid metal which, when the position of use changes, is available at a different location, thus serving the sufficient reliability of the current-limiting device. In the horizontal position of use, that is, with the longitudinal axis of the current-limiting device being oriented horizontally, the filling of the hollow spaces and the wetting with liquid metal of the surfaces which are important for the current transfer are equal for both electrodes. When the longitudinal axis is inclined, the hollow space of the electrode which moves upward empties of the liquid metal due to gravity in the measure in which the hollow space of the electrode which moves downward fills with liquid metal until, during further increasing inclination, the hollow space of the lower electrode fills completely with liquid metal and the hollow space of the upper electrode, in the extreme case, completely empties; however, this electrode still being sufficiently wetted with the liquid metal. A corresponding redistribution of the filling quantity takes place in the compression spaces, the plurality of connecting channels arranged per intermediate wall guaranteeing that in all intended positions of use, each intermediate wall is in contact with the liquid metal via at least one of its connecting channels. In each inclined position, in the case of an additional rotation about the longitudinal axis, the rotationally symmetrical design of the current-limiting device does not bring about any effective change in the distribution of the liquid metal in the hollow spaces and in the compression spaces so that during normal operation, a sufficient electrical connection between the electrodes exists in all possible positions of use. The connecting channels which are not in contact with the liquid metal serve, on one hand, for uniformly degassing the compression spaces during the filling of the current-limiting device and, on the other band, for pressure compensation between adjacent compression spaces during and subsequent to a short-circuit event.

The hollow spaces may have, for example, a pot-like, conically tapered design, or a double pot-like cylindrical design. In the latter case, a flat connecting lead can reach through the respective outer hollow space, the connecting lead taking the entire width of the outer hollow space for increasing the dimensional stability, a further opening serving the redistribution of the liquid metal in the outer hollow space during the inclination and rotation of the current-limiting device. A staggered arrangement of the connecting channels of adjacent intermediate walls prevents a long electric arc from burning across all compression spaces and, instead, forces the division into a plurality of effective, limiting partial electric arcs. GaInSn alloys as the liquid metal to be used are easy to handle because of their physiological harmlessness. An alloy of 660 parts by weight of gallium, 205 parts by weight of indium, and 135 parts by weight of tin is liquid from 10° C. to 2000° C. at normal pressure and possesses sufficient electrical conductivity.

BRIEF DESCRIPTION OF THE DRAWINGS

Further details and advantages of the present invention ensue from the following exemplary embodiments which will be explained on the basis of Figures.

DETAILED DESCRIPTION

Figure 1:
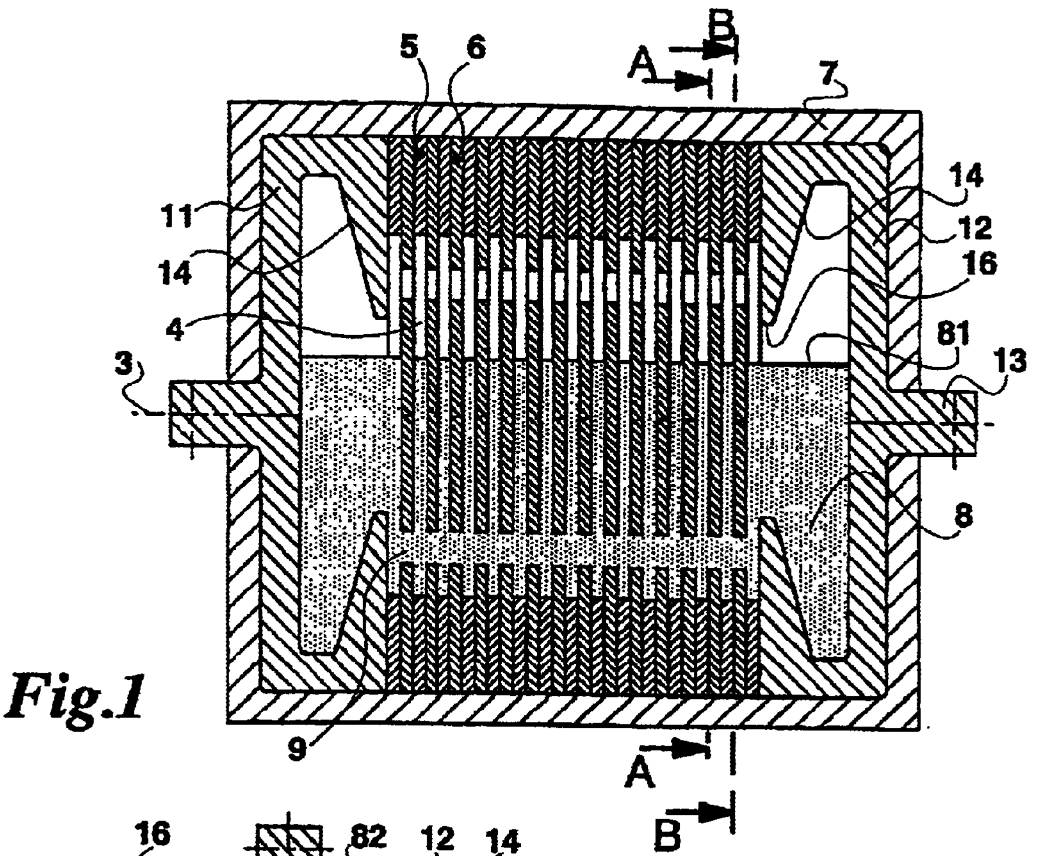
FIG. 1 shows a longitudinal section of a first exemplary embodiment of the current-limiting device according to the present invention in a horizontal position.
Figure 2:
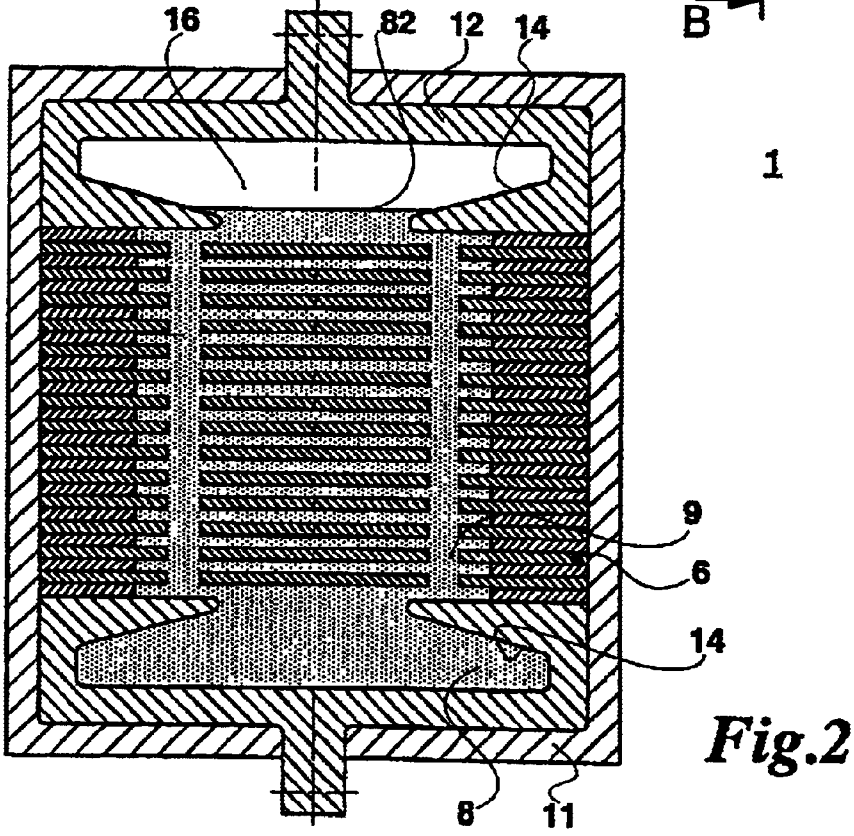
FIG. 2 shows the current-limiting device according to FIG. 1 in a vertical position.
Figure 5:
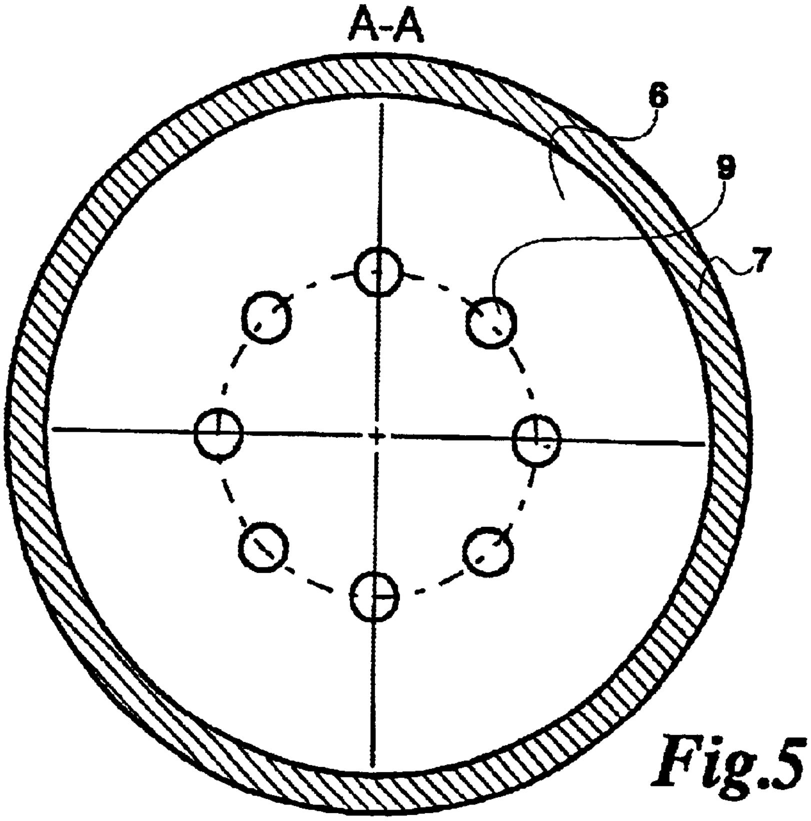
FIG. 5 shows the current-limiting device according to FIG. 1 or FIG. 3 in cross-section A—A.
Figure 6:
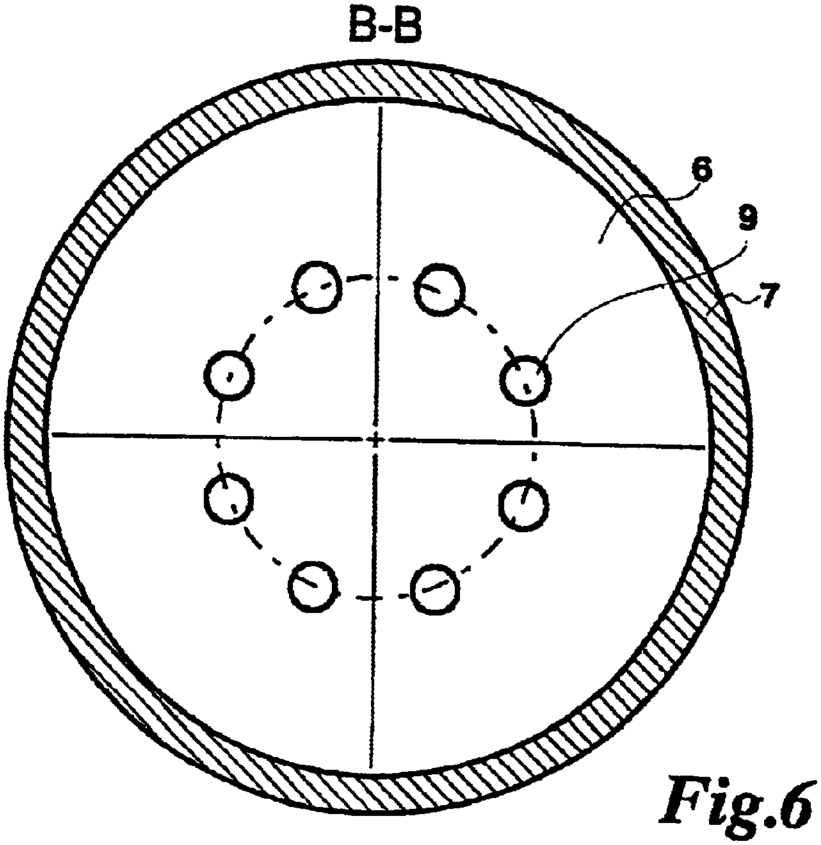
FIG. 6 shows the current-limiting device according to FIG. 1 or FIG. 3 in cross-section B—B.

Current-limiting device 1 according to FIG. 1 and FIG. 2 contains one electrode 11 or 12 made of solid metal, preferably of copper, on each of the two sides, respectively, the electrode having a rotationally symmetrical design in relation to longitudinal axis 3 of current-limiting device 1 and merging into an outer connecting lead 13. Between electrodes 11 and 12, a plurality of compression spaces 4 are located which are formed by a corresponding number of ring-shaped sealing disks 5 made of insulating material and a corresponding number of insulating intermediate walls 6. Electrodes 11 and 12, sealing disks 5, and intermediate walls 6 are supported by an insulating housing 7, a known sealing device being provided for sealing compression spaces 4 and frictionally connecting elements 5, 6, 11, and 12, which are supported in insulating housing 7, however, the known sealing device not being shown for reasons of clarity. The sealing device can be, for example, sealing rings between sealing disks 5 and intermediate walls 6. The two outer compression spaces 4 are each laterally bounded by one of electrodes 11 and 12, respectively, and by an intermediate wall 6. Inner compression spaces 4 are each laterally bounded by two intermediate walls 6. Sealing disks 5 and the generally multi-part insulating housing 7 are pressure-resistant insulating bodies. All compression spaces 4 are at least partially filled with a liquid metal 8, for example, a GaInSn alloy. Located above liquid metal 8 is, for example, a vacuum. Intermediate walls 6 are provided with connecting channels 9. At least one connecting channel 9 of each intermediate wall 6 is filled with liquid metal 8 so that a continuous electrically conductive connection exists between electrodes 11 and 12. Intermediate walls 6 each have several connecting channels 9 which are arranged in a circle around center axis 3 and which, according to FIG. 5 and FIG. 6, are staggered by a certain angular value between adjacent intermediate walls 6 to prevent a continuous electric arc in the current-limiting event.

According to the present invention, electrodes 11 and 12 are provided with a pot-like hollow space 14 which, in each case, is connected to adjacent compression space 4 in a conically tapering manner via an opening 16. Via openings 16 and via connecting channels 9, liquid metal 8 is distributed over hollow spaces 14 of electrodes 11, 12 and over compression spaces 4, depending on the position of use of current-limiting device 1. In this connection, hollow spaces 14 are more or less filled with liquid metal 8. In the horizontal position of current-limiting device 1 depicted in FIG. 1, liquid metal 8 is uniformly distributed both over the two hollow spaces 14 of electrodes 11 and 12 and over all compression spaces 4. In this position, both a large part of the inner surface of hollow space 14 and the surface bordering adjacent compression space 4 are wetted with liquid metal 8 in each electrode 11 and 12. In this position, moreover, the largest part of connecting channels 9 are below liquid level 81 while the remaining part is above it In the vertical position of current-limiting device 1 which is depicted in FIG. 2 and which extremely deviates from the horizontal position, hollow space 14 of electrode 11, which has moved downward, has completely filled with liquid metal 8 whereas hollow space 14 of electrode 12, which has moved upward, has emptied from liquid metal 8 for the most part, however, a sufficient part of the surface of upper electrode 12, namely, in its entirety, the surface bordering adjacent compression space 4 and opening 16 still being wetted with liquid metal 8. Moreover, all connecting channels 9 of all intermediate walls 6 are below liquid level 82 which runs in the region of opening 16 of upper electrode 12.

Figure 3:
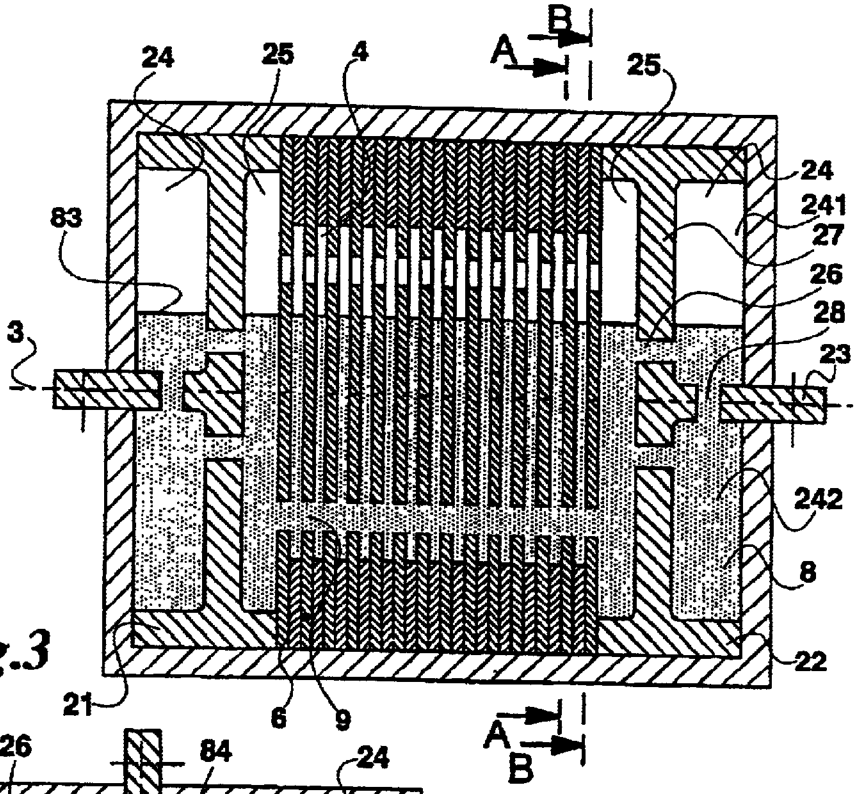
FIG. 3 shows a longitudinal section of a second exemplary embodiment of the current-limiting device according to the present invention in a horizontal position.
Figure 4:
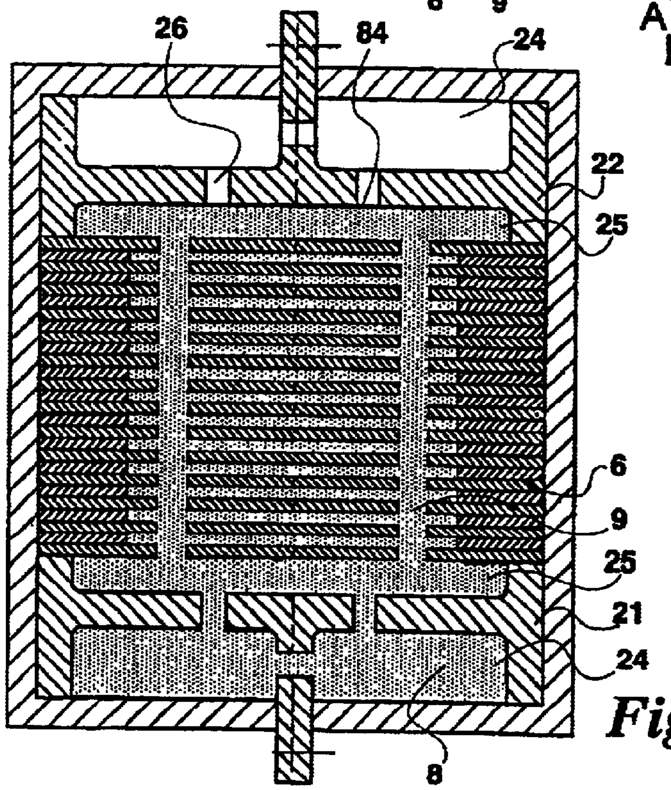
FIG. 4 shows the current-limiting device according to FIG. 3 in a vertical position.

Current-limiting device 2 depicted in FIG. 3 and FIG. 4 differs from previously described current-limiting device 1 in the design of electrodes 21 and 22. According to the present invention, electrodes 21 and 22 have a double pot-like design. Each of them possesses a cylindrical inner hollow space 25 which is open toward adjoining compression space 4, and a cylindrical outer hollow space 24 which is separated from the inner hollow space by a dividing wall 27. Outer hollow space 24 communicates with adjacent inner hollow space 25 via several openings 26 which are arranged in dividing wall 27 in a circle around center axis 3. A flat connecting lead 23 extends from dividing wall 27 of each electrode 21 and 22, respectively, the connecting lead dividing outer hollow space 24 into two partial spaces 241 and 242 which are connected via at least one further opening 28 in connecting lead 23. Via openings 26, 28 and via connecting channels 9, liquid metal 8 is distributed over hollow spaces 24, 25 of electrodes 21, 22 and over compression spaces 4, depending on the position of use of current-limiting device 2. In the horizontal position of current-limiting device 2 depicted in FIG. 3, liquid metal 8 is in each case uniformly distributed over outer hollow spaces 24 and inner hollow spaces 25 of both electrodes 21 and 22 and uniformly over all compression spaces 4. In this position, a large part of the inner surfaces of hollow spaces 24 and 25 is wetted with liquid metal 8 in each electrode 21 and 22. In this position, moreover, the largest part of connecting channels 9, which are arranged in a circle, are below liquid level 83 while the remaining part is above it. In the vertical position of current-limiting device 2 which is depicted in FIG. 4 and which extremely deviates from the horizontal position, hollow spaces 24 and 25 of electrode 21, which has moved downward, have completely filled with liquid metal 8 whereas outer hollow space 24 of electrode 22, which has moved upward, has completely emptied from liquid metal 8, however, the complete filling of inner hollow space 25 providing that upper electrode 22 is sufficiently wetted with liquid metal 8. Moreover, all connecting channels 9 of all intermediate walls 6 are below liquid level 84 which runs in the region of openings 26 of upper electrode 22.

The present invention is not limited to the above-described specific embodiments but also includes all equally acting embodiments along the lines of the present invention. Thus, for example, the knowledge of the internal pressure of the medium located above the liquid metal represents meaningful information on the functional reliability of the current-limiting device. This can advantageously be achieved by a pressure measuring device which reaches into the interior of the current-limiting device and which can be read from outside, for example, by a diaphragm pressure gauge which derives its reading from the pressure energy that is present inside, or by a gas friction vacuum gauge which, via a corresponding measuring head and a display unit, can indicate the pressure on request. Moreover, for regular monitoring of the current-limiting device it is advantageous if quality-deteriorating changes of the liquid metal, for example, due to contaminating or wearing thermal and/or chemical decomposition products or impurities, can be checked via a diagnostic opening which reaches into the interior of the current-limiting device, for example, for a corresponding diagnostic probe or a suction sampling device.

What is claimed is:

1. A self-recovering current-limiting device including a liquid metal, the device comprising:

a first and a second electrode for connection to an electric circuit to be protected, each of the first and second electrodes being made of solid metal, being rotationally symmetrical with respect to a longitudinal axis, and defining a respective hollow space in the respective electrode;

a plurality of pressure-resistant insulating bodies; and a plurality of insulating intermediate walls interleaved with and supported by the plurality of pressure-resistant insulating bodies and defining a plurality of connecting channels disposed in a circular pattern, the plurality of pressure-resistant insulating bodies and the insulating intermediate walls together defining a plurality of compression spaces disposed between the first and second electrodes, the plurality of compression spaces being interconnected by the plurality of connecting channels and being at least partially filled with the liquid metal;

wherein the respective hollow spaces are each connected to an adjacent respective one of the plurality of compression spaces and wherein a respective volume of each of the hollow spaces and an amount of the liquid metal in the current-limiting device are selected so that an upper one of the first and second electrodes is sufficiently wetted with the liquid metal when the current-limiting device is in a position deviating substantially from a position when the longitudinal axis is horizontal.

2. The device as recited in claim 1 wherein each of the hollow spaces have a pot-like shape tapering in a conical manner into an opening to the adjacent respective one of the plurality of compression spaces.

3. The device as recited in claim 1 wherein each of the hollow spaces has a double pot-like shape and includes a respective cylindrical inner chamber and a respective cylindrical outer chamber, each of the first and second electrodes further defining a respective plurality of openings arranged in a circular pattern about the longitudinal axis for connecting the respective cylindrical outer chamber to the respective cylindrical inner chamber, each of the respective cylindrical inner chamber being connected to the adjacent respective one of the plurality of compression spaces.

4. The device as recited in claim 3 wherein each of the first and second electrodes includes a respective flat connecting lead dividing the respective outer chamber into two respective partial spaces, each respective flat connecting lead defining a respective opening for connecting the two respective partial spaces.

5. The device as recited in claim 1 wherein respective ones of the plurality of connecting channels of adjacent intermediate walls are angularly staggered with respect to one another.

6. The device as recited in claim 1 wherein the liquid metal includes a GaINSn alloy.

* * * * *